(12) United States Patent
Park et al.

(10) Patent No.: US 9,250,150 B1
(45) Date of Patent: Feb. 2, 2016

(54) TURBOCHARGER WHEEL BALANCE-TEST JIG

(71) Applicant: HONEYWELL INTERNATIONAL INC., Morristown, NJ (US)

(72) Inventors: Geoffrey Park, Epinal (FR); Dominique Armand, Uxegney (FR); Francis N. Rivot, Frenelle la Grande (FR); Gerard H. Dieudonne, Les Forges (FR)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/544,338

(22) Filed: Dec. 23, 2014

(51) Int. Cl.
*F04D 17/10* (2006.01)
*G01M 1/16* (2006.01)

(52) U.S. Cl.
CPC .................................. *G01M 1/16* (2013.01)

(58) Field of Classification Search
CPC ........................................................ F04D 17/10
USPC ............................................................ 73/460
See application file for complete search history.

(56) References Cited

U.S. PATENT DOCUMENTS

| | | | | |
|---|---|---|---|---|
| 2009/0293257 A1* | 12/2009 | Castan | ................... | F16B 19/02 29/464 |
| 2011/0110767 A1* | 5/2011 | Castan | ................... | F01D 17/165 415/159 |
| 2011/0120125 A1* | 5/2011 | Castan | ................... | F02C 6/12 60/605.3 |
| 2013/0115080 A1* | 5/2013 | Castan | ................... | F01D 25/162 415/229 |
| 2013/0115088 A1* | 5/2013 | Castan | ................... | F04D 25/045 416/204 A |
| 2015/0219121 A1* | 8/2015 | King | ................... | F16B 43/00 415/119 |

* cited by examiner

*Primary Examiner* — Lisa Caputo
*Assistant Examiner* — Jamel Williams
(74) *Attorney, Agent, or Firm* — The Law Office of John A. Griecci

(57) ABSTRACT

A turbocharger wheel balance-test jig including a base, a clamp mechanism, and an arm. The arm extends along an axis of rotation. The clamp mechanism includes an actuator actuatable between a locked position and an unlocked position, the locked position rigidly holding the arm with respect to the base. The clamp mechanism includes a stop configured to restrict rotation of the arm around the axis of rotation. In a method for acceptance testing an imbalance level of a turbocharger wheel, an imbalance level of the balance-test jig is measured, and subtracted from a plurality of measurements of a combined imbalance level of the turbocharger wheel balance-test jig and the turbocharger wheel. An estimated indicator of turbocharger wheel imbalance is then formed, and the turbocharger wheel is accepted or rejected based upon whether the estimated indicator of the turbocharger wheel imbalance is within an acceptable indicator range.

9 Claims, 9 Drawing Sheets

TURBOCHARGER WHEEL BALANCE-TEST JIG

The present invention relates generally to tooling for testing the dynamic balance of turbocharger wheels, and more particularly, to a balance-test jig for acceptance testing the imbalance of very small radial turbine wheels.

BACKGROUND OF THE INVENTION

Turbine wheels are typically cast in rough form and then machined into a final shape. It is known to statically measure the balance of a cast, unfinished radial turbocharger turbine wheel by affixing it in a balance-test jig and statically finding a center of mass in two radial dimensions (two lateral dimensions normal to one another and normal to an anticipated axis of rotation). It is further known as mass centering to drill a small feature (a center drill) such as a conical hole on an axial end of the wheel at the two-dimensional center of mass to establish a center of rotation for the wheel. Machining of the wheel can then be conducted with respect to that center of rotation.

It is also known to use a balance-test jig to radially clamp around the blades of the turbine wheel, and also onto a backplate of a turbine wheel at a datum plane. Using this in a rotating fixture, centering measurements may be made at one axial plane of the wheel. Mass centering can then be done. While more accurate than a static measurement, this does not lead to accuracy and repeatability, as unfinished wheels will not typically have the geometric center be the mass center. Therefore, each time the wheel is mounted in the balance-test jig, it may have a different imbalance.

Extensive machining of small turbine wheels is difficult and expensive. The more machining that is required, the greater the level of difficulty and the greater the cost. When outsourcing the manufacture of cast, unfinished turbine wheels, it may therefore be desirable to set limits on the imbalance of the purchased wheels, and to enforce those limits with product testing. Great accuracy is desirable when testing such imbalance limits, and this level of accuracy is particularly difficult with very small turbine wheels.

One difficulty in such testing is that balance-test jigs for holding a turbine wheel are typically characterized by their own levels of imbalance. This is imbalance is exacerbated by the locking mechanisms of the balance-test jigs, which may produce a different imbalance every time it is locked on to a wheel.

Accordingly, there has existed a need for a turbocharger wheel balance-test jig that can very accurately test the imbalance of very small radial turbocharger wheels. Preferred embodiments of the present invention satisfy these and other needs, and provide further related advantages.

SUMMARY OF THE INVENTION

In various embodiments, the present invention may solve some or all of the needs mentioned above, providing a turbocharger wheel balance-test jig that can very accurately test the imbalance of very small radial turbocharger wheels. In other embodiments, the present invention may include a method for acceptance testing an imbalance level of a turbocharger wheel.

The turbocharger wheel balance-test jig includes a base, a clamp mechanism rigidly connected to the base, and an arm. The base defines an axis of rotation, and has a base clamping face forming at least a portion of a base conical feature that is normal to and rotationally symmetric around the axis of rotation. The arm extends along the axis of rotation from the clamp mechanism toward the base clamping face. The arm has an arm clamping face forming at least a portion of an arm conical feature that is normal to and rotationally symmetric around the axis of rotation. The clamp mechanism includes an actuator that is actuatable between a locked position and an unlocked position, the locked position rigidly holding the arm with respect to the base, and the unlocked position providing for the arm to be axially moved along the axis of rotation. The clamp mechanism includes a stop configured to restrict rotation of the arm around the axis of rotation in both the unlocked and the locked positions. Advantageously, the clamp mechanism provides for the balance-test jig to have an imbalance level that varies very little between each time the balance-test jig is actuated to its locked position.

The method for acceptance testing an imbalance level of a turbocharger wheel, the wheel including a hub having a back face and a nose cone, includes a first step of mounting the turbocharger wheel balance-test jig in a dynamic balancing machine. An imbalance level of the of the turbocharger wheel balance-test jig is measured using the dynamic balancing machine. The turbocharger wheel is mounted in the balance-test jig, and a combined imbalance level of the turbocharger wheel balance-test jig and the turbocharger wheel is measured using the dynamic balancing machine. The turbocharger wheel is removed from the balance-test jig and again mounted in the balance-test jig, and imbalance measurements are again taken. This establishes a plurality of combined imbalance levels of the turbocharger wheel balance-test jig and the turbocharger wheel.

An estimated indicator of turbocharger wheel imbalance is then formed based upon both the imbalance level of the turbocharger wheel balance-test jig and a combination of the plurality of the combined imbalance levels of the turbocharger wheel balance-test jig and the turbocharger wheel. The turbocharger wheel is then accepted or rejected based upon the estimated indicator of the turbocharger wheel imbalance. Advantageously, the multiple installations of the turbocharger wheel allow for any imbalance caused by a less than accurate mounting of the turbocharger wheel in the balance-test jig to be minimized in total. Moreover, because the imbalance level of the jig varies only minimally between the different mountings of the turbocharger wheels in the balance-test jig, the effects of balance-test jig imbalance can be accurately removed from the final calculation of turbocharger wheel imbalance.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Typical embodiments of the present invention reside in a turbocharger wheel balance-test jig that can be balanced prior to clamping in a turbocharger wheel, such as a turbine wheel. Preferred embodiments of the balance-test jig are assemblies that are not subject to varying imbalance levels during actuation on to a turbocharger wheel. Additional embodiments of the present invention reside in a method for acceptance testing an imbalance level of a turbine wheel using the typical embodiments of a turbocharger wheel balance-test jig.

Turbocharger Wheel Balance-Test Jig

Figure 1:
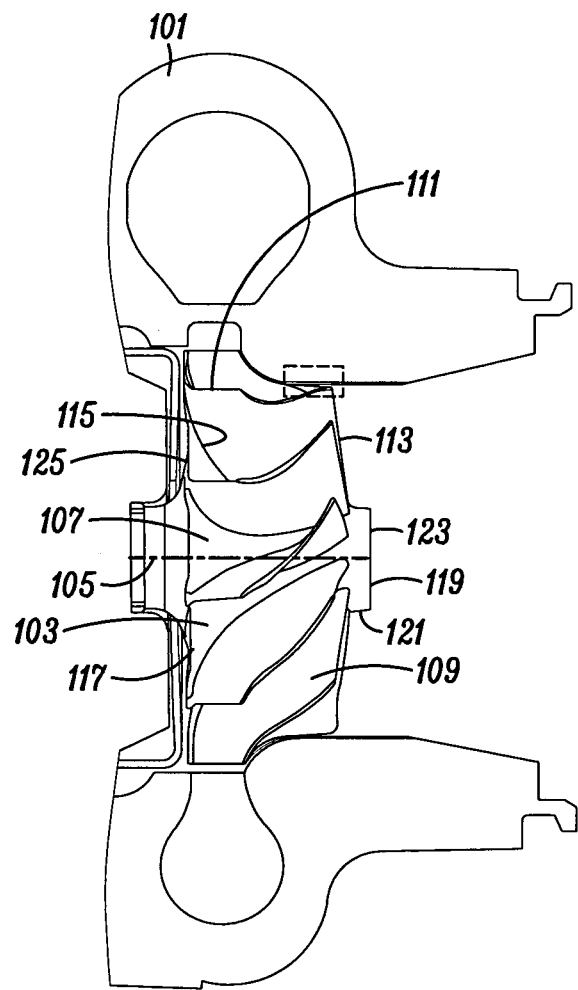
FIG. 1 is a cross-section front view of a turbine housing containing a turbine wheel.
Figure 2:
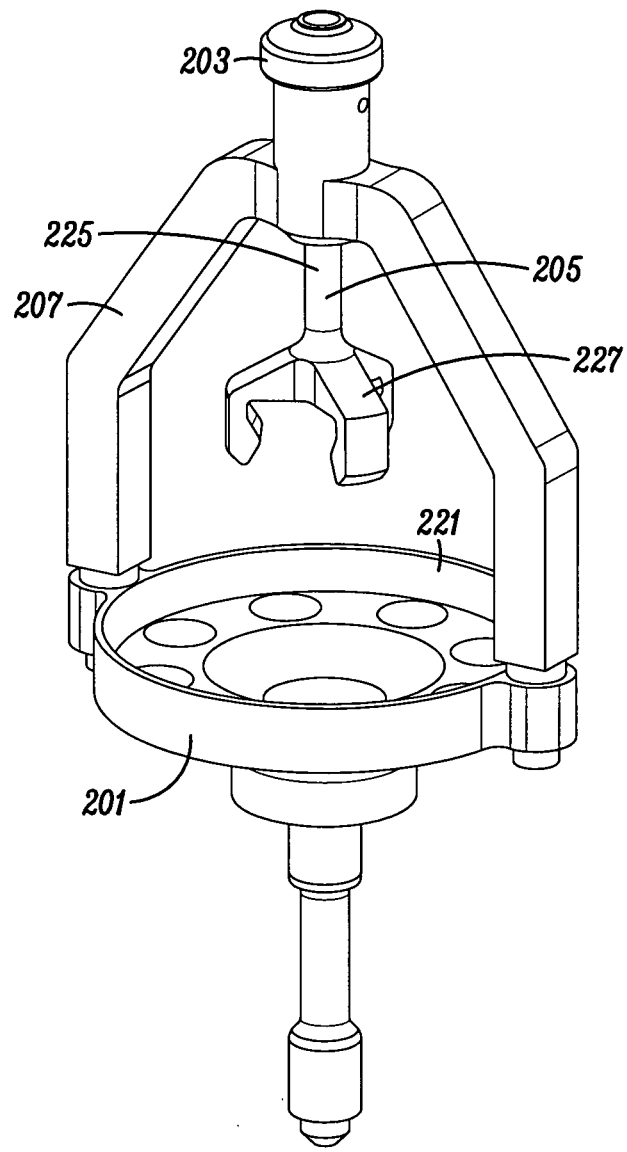
FIG. 2 is a perspective view of a turbocharger wheel balance-test jig embodying the invention.
Figure 3:
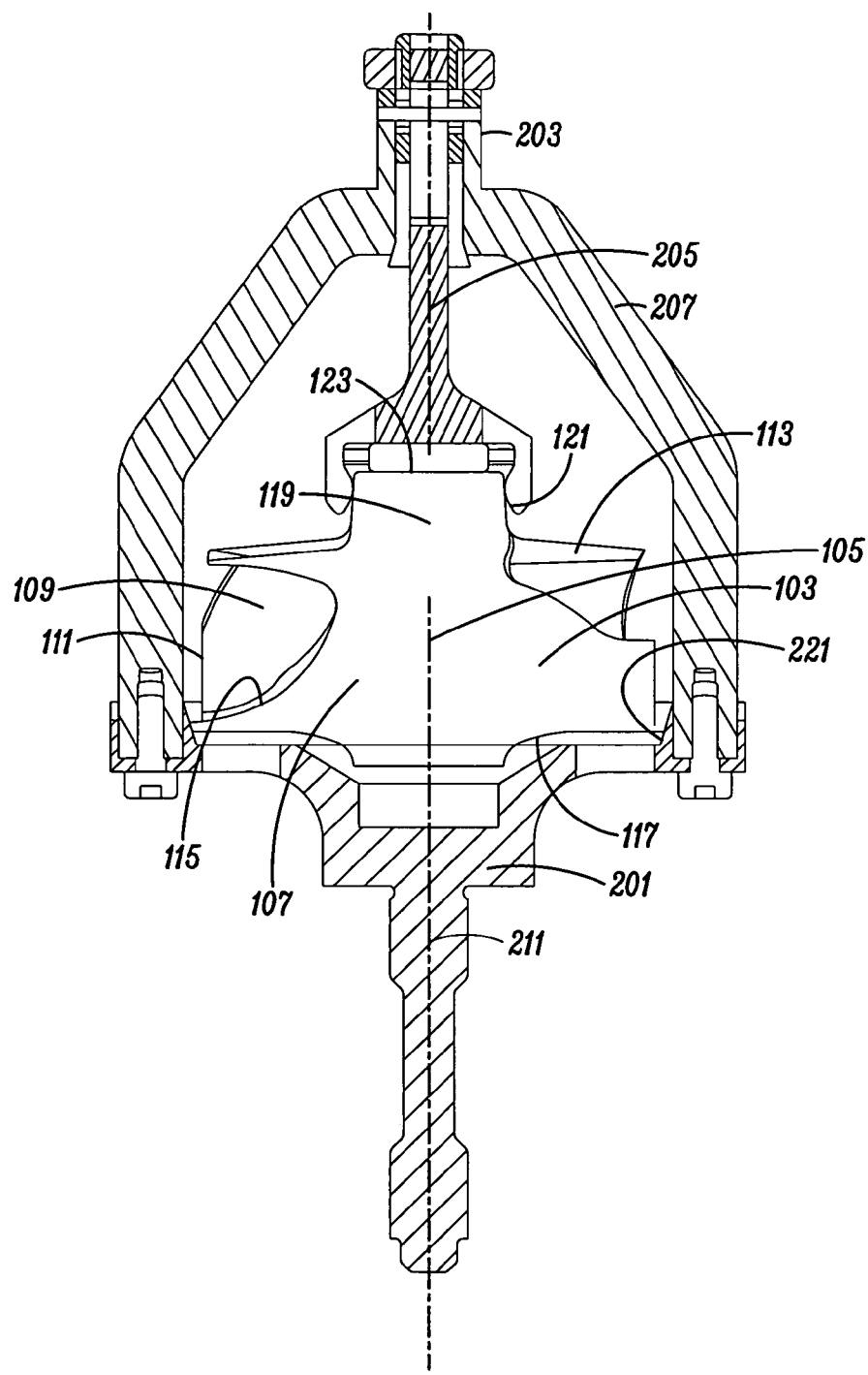
FIG. 3 is a cross-sectional front view of the turbocharger wheel balance-test jig depicted in FIG. 2, with a turbine wheel rigidly locked into the turbocharger wheel balance-test jig.
Figure 4:
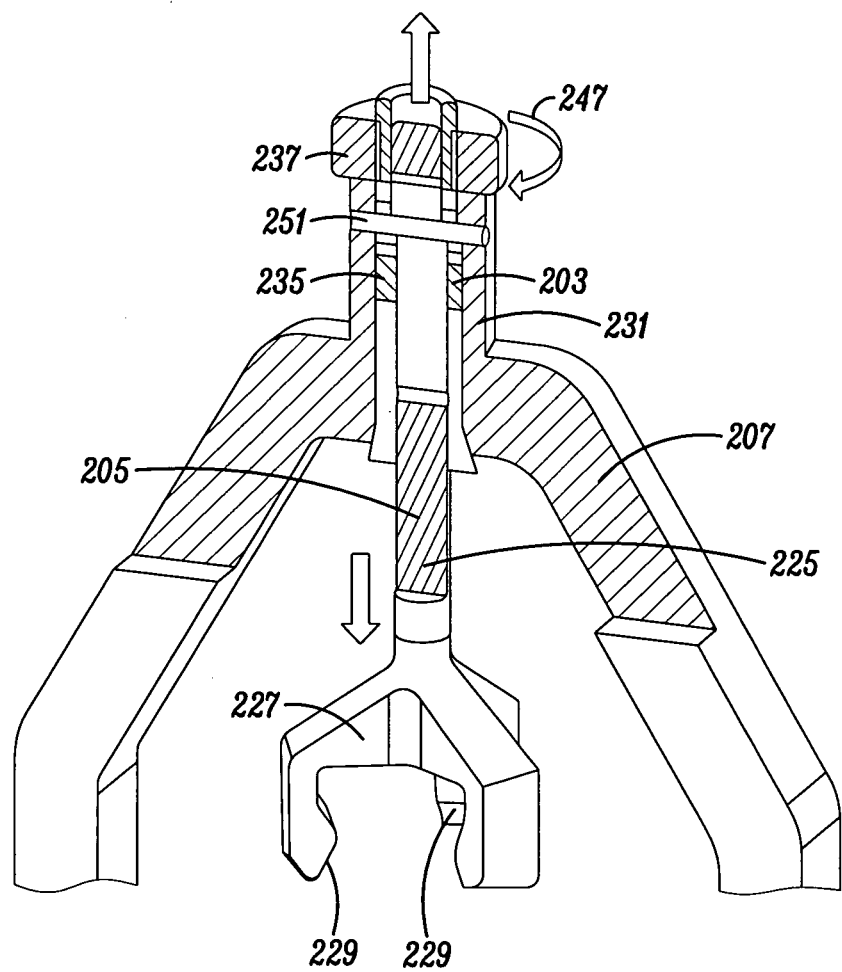
FIG. 4 is a cutaway view of a portion of the turbocharger wheel balance-test jig depicted in FIG. 2.
Figure 5:
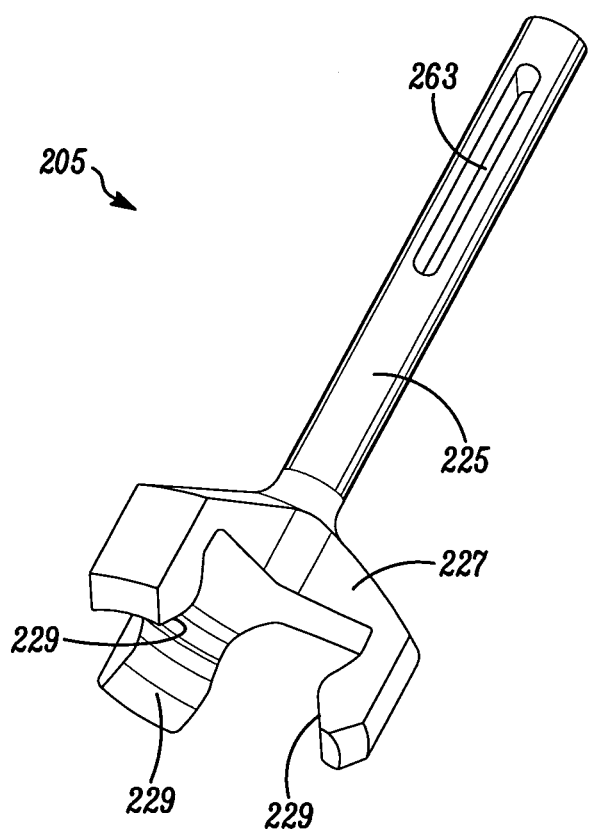
FIG. 5 is a perspective view of an arm that is part of the turbocharger wheel balance-test jig depicted in FIG. 2.
Figure 6:
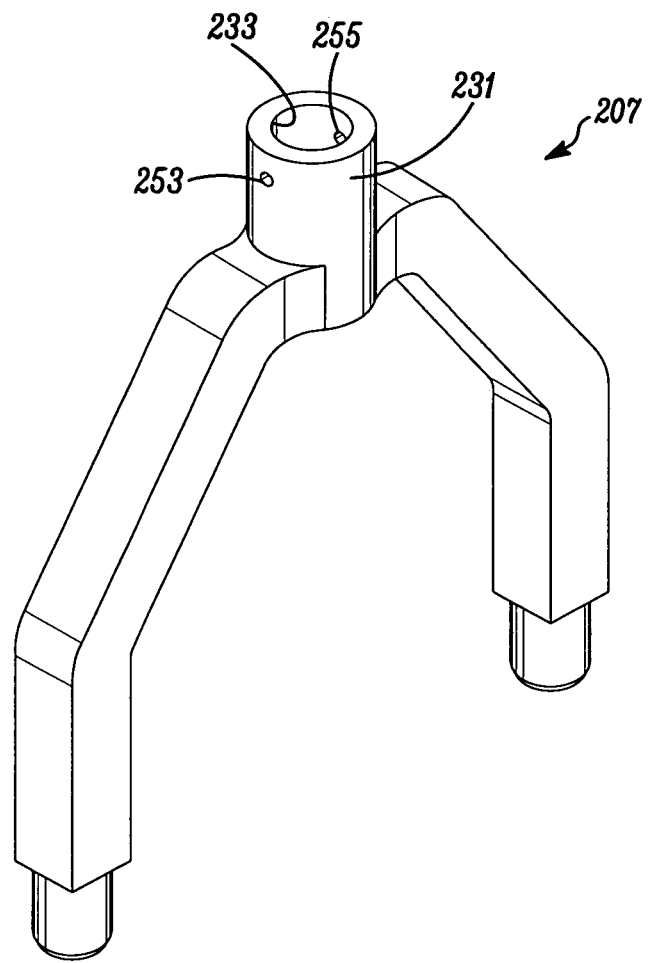
FIG. 6 is a perspective view of a jig body that is part of the turbocharger wheel balance-test jig depicted in FIG. 2.
Figure 7:
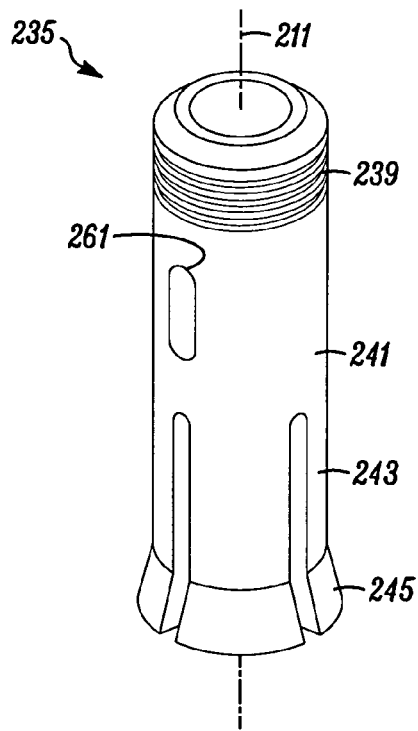
FIG. 7 is a perspective view of a collet that is part of the turbocharger wheel balance-test jig depicted in FIG. 2.
Figure 8:
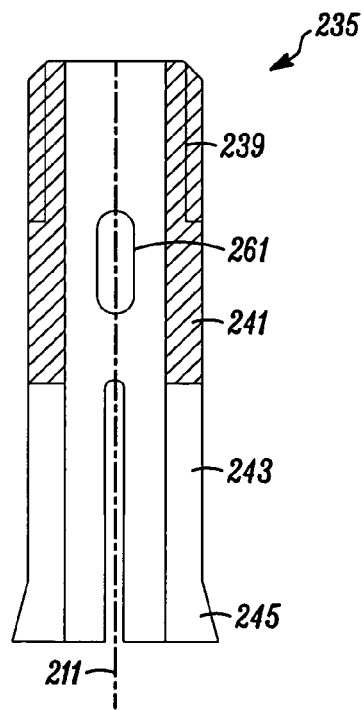
FIG. 8 is a cross-sectional front view of the collet depicted in FIG. 7.

With reference to FIGS. 1 and 3, in a typical automotive turbocharger, a turbine housing 101 and turbine wheel 103 form a turbine configured to circumferentially receive a high-pressure and high-temperature exhaust gas stream from an engine, e.g., from an exhaust manifold of an internal combustion engine. The turbine wheel is driven in rotation around an axis of rotor rotation 105 by the high-pressure and high-temperature exhaust gas stream, which becomes a lower-pressure and lower-temperature exhaust gas stream and is axially released into an exhaust system (not shown).

The turbine wheel 103 has a hub 107 and a plurality of free-ended blades 109 (i.e., it is free-ended in that the blades do not carry a rotating shroud), and rotates symmetrically around the axis of rotor rotation 105. Each blade has a radially facing leading edge 111 and an axially facing trailing edge 113. The hub is characterized by a generally conical shape, being rotationally symmetric around the axis of rotor rotation. The hub has a front face 115 from which the blades extend, and a back face 117. The hub includes a nose cone 119 that extends axially downstream from the trailing edges of the blades to form a downstream end of the hub. A small chamfer 121 is formed around a circumference of an axial end 123 of the nose cone 119. The hub also has a backface 125.

The turbine wheel 103 is typically cast in rough form and then machined into a final shape. The more balanced the rough form turbine wheel, the less machine work will be required to finish the turbine wheel, and the less imbalanced the finished wheel will be. The casting process may be subcontracted out to a supplier having specialized skill and experience in that process. It is therefore desirable to require casting subcontractors to deliver rough form turbine wheels having imbalance levels below a tolerance level, and to have a reliable method for acceptance testing imbalance levels. For the sake of accuracy, it is further desirable for the acceptance testing to be dynamic, rotational balance testing. Finally, for even better accuracy levels, particularly for very small parts, it is desirable to minimize any contribution to the imbalance measurement by parts of the testing equipment, e.g., the balance-test jig that holds the turbine wheel during testing.

For imbalance testing, it is desirable to take more than one measurement and then compare and combine a group of results to form a composite result. This composite result could be generated using various known techniques, such as averaging, throwing out extreme measurements, and the like.

Balance-test jigs can be imbalance tested prior to the insertion of a turbocharger wheel, thereby providing a potential imbalance level that is contributed by the balance-test jig. Nevertheless, a problem with known balance-test jigs is that they are characterized by mounting hardware that changes the jig imbalance level each time a wheel is mounted in the jig. This variation in balance-test jig imbalance level serves as a limit to the accuracy of the imbalance testing process.

With reference to FIGS. 2 to 5, a first embodiment of the invention is a turbocharger wheel balance-test jig includes a base 201, a clamp mechanism 203, an arm 205 and a jig body 207 that rigidly connects and joins the base to the clamp mechanism. The base and arm each define a jig axis of rotation 211 that extends between them. The base, arm, clamp mechanism and jig body are each preferably rotationally symmetric around the axis of rotation. Moreover, the base, arm, clamp mechanism and jig body are each preferably characterized by a center of mass that substantially lies on the axis of rotation 211.

The base 201 has a base clamping face 221 that establishes and forms at least a portion of a base conical feature that is normal to and rotationally symmetric around the axis of rotation 211. In the present embodiment as depicted, the base clamping face forms the full base conical feature. In other words, the base clamping face is one or more surfaces that together form all or part of a cone.

It is to be understood that the base conical feature is a conical surface that would be formed by the base clamping face 221 if the base 201 were rotated around the axis of rotation 211. It may be that only portions of the base conical feature are actually formed by the base clamping face. In such a case, these portions would be enough of the base conical feature to provide firm, multidirectional structural support for locking a turbocharger wheel between the arm 205 and the base. The base conical feature could be a straight sided cone (as depicted), or could include some curvature when viewed in a cross section taken in a plane that includes the axis of rotation.

The arm 205 extends along the axis of rotation 211 from the clamp mechanism 203 toward the base clamping face 221. The arm has a shaft 225 and a clamping body 227. The clamping body forms an arm clamping face 229 that forms at least a portion of an arm conical feature that is normal to and rotationally symmetric around the jig axis of rotation 211. In other words, the arm clamping face is one or more surfaces that together form all or part of a cone.

It is to be understood that the arm conical feature is a conical surface that would be formed by the arm clamping face 221 if the arm 205 were rotated around the axis of rotation. It may be that only portions of the arm conical feature are actually formed by the arm clamping face 229 (as is the case for the depicted arm). In such a case, these portions would be enough of the arm conical feature to provide firm, multidirectional structural support for locking a turbocharger wheel between the arm and the base 201. The arm conical feature could be a straight sided cone (as depicted), or could include some curvature when viewed in a cross section taken in a plane that includes the axis of rotation.

The base conical feature and the arm conical feature face one another, i.e., each opens up toward the other such that the turbine wheel 103 could be rigidly held between the arm clamping face 229 and the base clamping face 221.

With reference to FIGS. 4 through 8, the jig body 207 includes a clamp housing 231 that serves as an integral part of the clamp mechanism 203. The clamp housing forms an axial bore 233 that axially receives the arm shaft 225 concentrically along the jig axis of rotation 211.

The clamp mechanism 203 also includes an actuator that is actuatable between a locked position and an unlocked position. In the locked position, the actuator rigidly holds the arm shaft 225 of the arm 205 with respect to the clamp housing 231, and thereby with respect to the base 201. In the unlocked position the actuator provides for the arm 205 to be axially moved along the jig axis of rotation 211.

The actuator includes a collet 235 and a locking nut 237. In serial order along the jig axis of rotation 211, the collet includes a threaded portion 239, a hollow cylindrical shaft portion 241, a plurality of flange portions 243, and at a distal end of each flange portion, a locking portion 245. The flange portions are structurally similar to the cylindrical shaft portion, but are separated by gaps to provide radial flexibility. The cylindrical shaft portion and flange portions extend concentrically through the bore 233 of the clamp housing 231 between the arm shaft 225 and the clamp housing. The collet threaded portion extends out of an upper end of clamp housing, and is threadedly received by threads on the locking nut.

The locking portions 241 are wedge shaped, extend below a lower end of the clamp housing 231. A distal end of each locking portion (i.e., the end farthest from the flange portion) is thicker than a proximal end of the locking portion, and is also larger than a radial gap between the cylindrical shaft portion and flange portion through which the flange portions extend.

When the locking nut 237 is turned around the axis of rotation 211 in a first direction 247 (e.g., clockwise) with respect to the clamp housing 231, the locking portion 241 of the collet 235 is drawn up between the clamp housing and the arm shaft 225, thereby achieving an actuator locked position wherein the arm is rigidly held with respect to the clamp housing by the collet locking portion. When the locking nut is turned around the axis of rotation in a second, opposite direction with respect to the clamp housing 231, the locking portion of the collet is allowed to slip out from between the clamp housing and the arm shaft, thereby achieving an actuator unlocked position wherein the arm is not rigidly held with respect to the clamp housing and can be axially moved.

The clamp housing 231 further includes a stop in the form of a pin 251 rigidly extending straight through and across the bore 233 from a first clamp housing hole 253 to a second clamp housing hole 255. The pin crosses normal to and directly across the jig axis of rotation 211. The pin passes through two axially extending holes 261 in the hollow cylindrical shaft portion 241 of the collet 235, and an axially extending hole 263 in the arm shaft 225 of the arm 205. The axially extending holes of the collet provide adequate clearance for the collet to move axially within the bore 233 between the locked and unlocked positions of the collet. The axially extending holes of the arm provide for the arm to move axially within the bore 233 between a position that restrains a turbine wheel and a position that allows insertion and removal of a turbine wheel.

The axially extending holes 261 of the collet 235, and the axially extending hole 263 of the arm shaft 225 are sized to cooperate with the pin 251 to restrict rotation of the collet and arm around the axis of rotation 211 with respect to the clamp housing. As a result, the collet and arm are restrained from rotation around the jig axis of rotation 211 such that they are always in the same rotational orientation with respect to the clamp housing 231 regardless of whether the actuator is in the locked or unlocked position. Moreover, because neither the axial position of the arm 205 nor the presence of a turbocharger wheel affects the amount of actuation necessary for the clamp mechanism to reach the locked position, the locking nut 237 and the collet 235 are in substantially the same position with respect to the clamp housing 231 when the actuator is in the locked position.

Because no parts of the balance-test jig move radially, and because the locking nut 237 is only part of the balance-test jig that moves rotationally (with respect to the other parts), and it is in substantially the same relative rotational position when the actuator is in the locked configuration, the balance-test jig will have substantially the same imbalance every time the jig actuator is in its locked configuration. Therefore, the balance-test jig will only vary in imbalance when it is removed and reinstalled in a dynamic balancing machine.

While the pin 251 serves as a stop for the rotation of both the arm 205 and the collet 235, it should be understood that other types of stop are within the scope of the invention.

Method for Acceptance Testing

Figure 9:
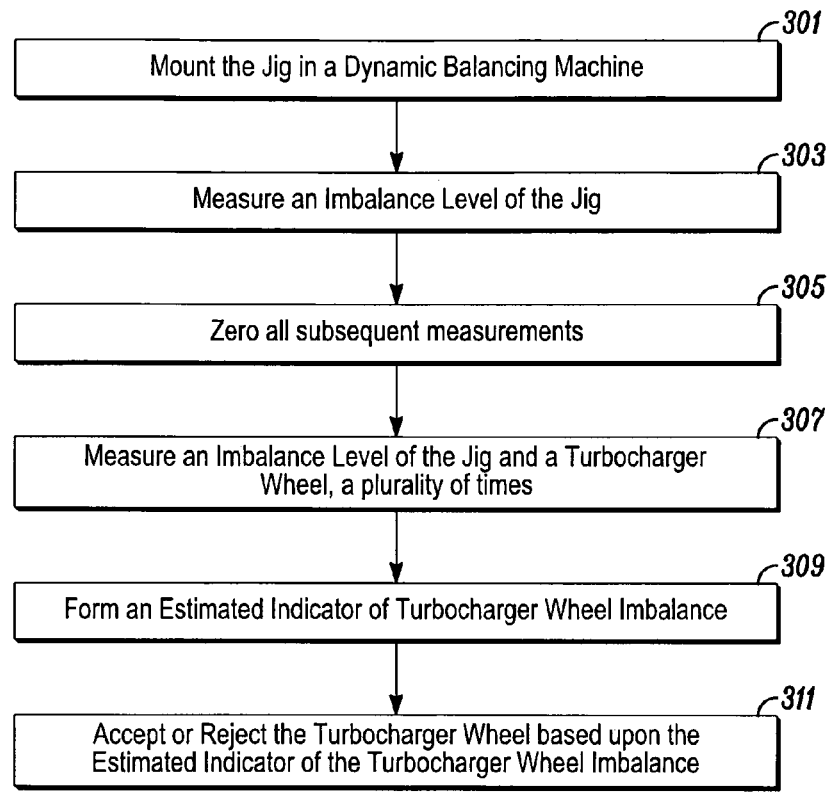
FIG. 9 is a method for acceptance testing an imbalance level of a turbocharger wheel.

With reference to FIG. 9, another embodiment of the invention is a method for acceptance testing an imbalance level of a turbocharger wheel. This embodiment of a method includes six steps. Without consideration of order, a first step 301 is to mount a turbocharger wheel balance-test jig in a dynamic balancing machine. A second step 303 is to measure an imbalance level of the of the turbocharger wheel balance-test jig using the dynamic balancing machine. A third step 305 is to zero all subsequent measurements. A fourth step 307 is to measure an imbalance level of the turbocharger wheel balance-test jig and turbocharger wheel, using the dynamic balancing machine, a plurality of times, each time with the turbocharger wheel being separately installed in the turbocharger wheel balance-test jig. A fifth step 309 is to form an estimated indicator of turbocharger wheel imbalance based upon a combination of the plurality of the imbalance levels of the turbocharger wheel balance-test jig and the turbocharger wheel. A sixth step 311 is to accept or reject the turbocharger wheel based upon the estimated indicator of the turbocharger wheel imbalance, i.e., compare the estimated indicator of turbocharger wheel imbalance to an acceptable indicator range (e.g., less than a certain number), and then reject the turbocharger wheel if the estimated indicator of the turbocharger wheel imbalance is outside of the acceptable indicator range.

The order of these steps is constrained only to the extent necessary to conduct the steps. For example, the first step 301 (mounting the turbocharger wheel balance-test jig) must be done prior to both the second step 303 and the fourth step 307 because the turbocharger wheel balance-test jig must be mounted for the measurements to be done. Likewise, the fifth step 309 (forming an estimated indicator of turbocharger wheel imbalance) must be completed prior to the sixth step 311 because the estimated indicator of turbocharger wheel imbalance is needed to complete the sixth step.

The First Step

Under the first step 301 of the method, the turbocharger wheel balance-test jig (as described above) is attached to and locked into the dynamic balancing machine. Preferably the turbocharger wheel balance-test jig remains attached to and locked into the dynamic balancing machine until the second step 303 and the fourth step 307 are completed, as removing and reattaching the turbocharger wheel balance-test jig could introduce error by varying the imbalance level of the turbocharger wheel balance-test jig as it is mounted in the machine.

The Second Step

Figure 10:
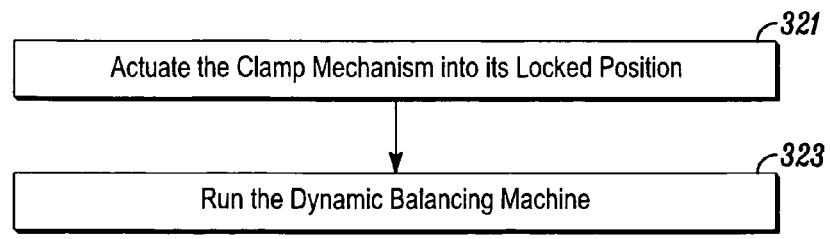
FIG. 10 is additional details about the step of measuring an imbalance level of a jig, within the method for acceptance testing an imbalance level of a turbocharger wheel depicted in FIG. 9.

With reference to FIGS. 9 and 10, under the second step 303 of the method, the clamp mechanism actuator of the turbocharger wheel balance-test jig is actuated into its locked position 321 if it is not already in that position. With the turbocharger wheel balance-test jig locked into the dynamic balancing machine and the clamp mechanism actuator actuated to the locked position, the dynamic balancing machine is then run 323, i.e., it causes the turbocharger wheel balance-test jig to be spun at a high rate of speed.

The Third Step

The dynamic balancing results are zeroed 325 for all subsequent measurements based on this mounting of the test jig in this configuration. For the first (primary) embodiment method, this means that the balancing machine is Zero Reset adjusted to provide future imbalance levels that only reflect differing levels from the level of imbalance of the jig). This is done to remove any residual unbalance of the jig. The Zero Reset process for a balancing machine is balancing-machine specific, and is typically conducted by following procedures provided by that specific machine's manufacturer. In this primary embodiment, the third step will be done prior to the fourth step.

In a first alternative variation of this embodiment method, rather than conducting a Zero Reset of the machine, measurements of the jig imbalance are taken at the same datum planes that will be described below for the primary embodiment method. These measurements are then mathematically removed from the measured results of the fourth step once they are taken. In this first alternative variation, the third step will be done concurrently with or subsequent to the fourth step.

The Fourth Step

Figure 11:
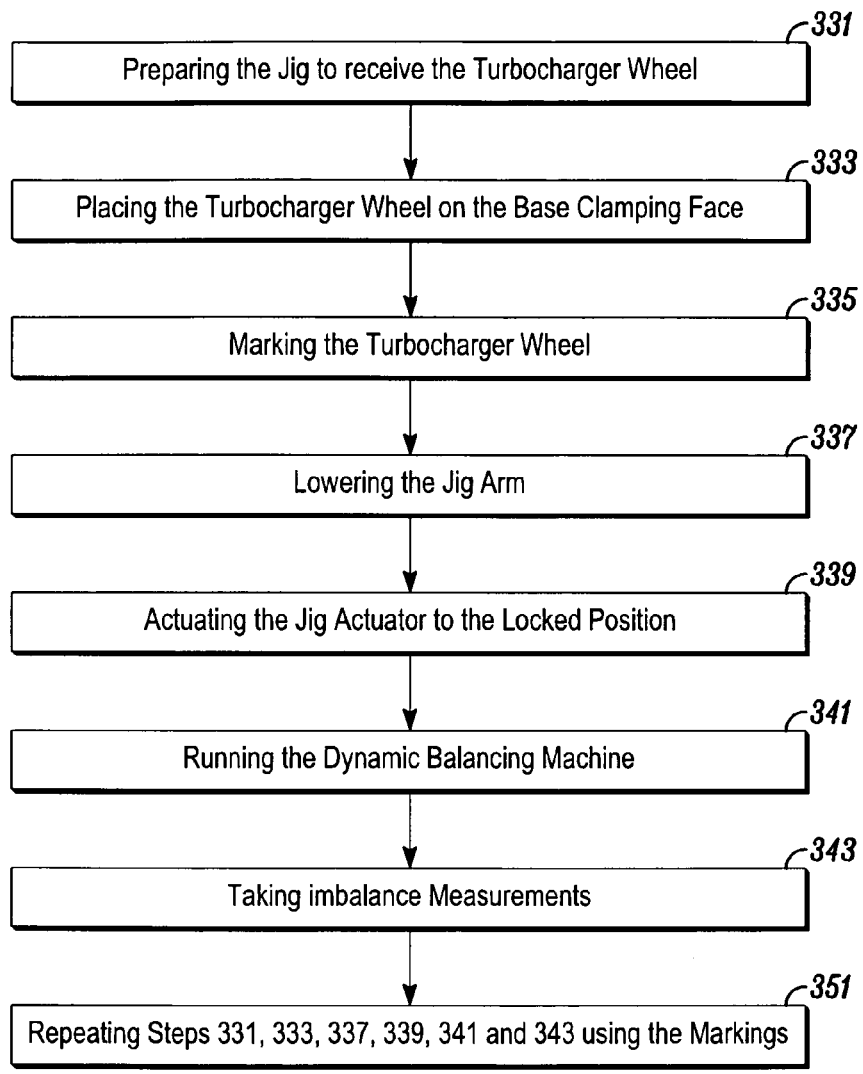
FIG. 11 is additional details about the step of measuring an imbalance level of a turbocharger wheel, within the method for acceptance testing an imbalance level of a turbocharger wheel depicted in FIG. 9.

With reference to FIGS. 1, 9 and 11, under the fourth step 307, with the turbocharger wheel balance-test jig locked into the dynamic balancing machine, the turbocharger wheel balance-test jig is prepared 331 to receive the turbocharger wheel 103, i.e., the turbocharger wheel balance-test jig actuator is actuated to the unlocked position and the balance-test jig arm is raised (if they are not already in these respective positions), and if anything (e.g., the turbine wheel) is in the turbocharger wheel balance-test jig, it is removed. An outer perimeter of the backface of the turbocharger wheel is placed 333 on the base clamping face of the balance-test jig base such that the back face of the turbocharger wheel is centered on the base clamping face. The turbocharger wheel is marked 335 with a mark such that the rotational orientation with respect to the base can be established and repeated for subsequent measurements. The turbocharger wheel balance-test jig arm is lowered 337 to position the arm clamping face against the turbocharger wheel nose cone such that the balance-test jig arm is centered on the turbocharger wheel nose cone.

With the back face of the turbocharger wheel centered on the base clamping face and the turbocharger wheel balance-test jig arm centered on the nose cone, the turbocharger wheel balance-test jig actuator is actuated from the unlocked position to the locked position 339, rigidly locking the turbocharger wheel into the turbocharger wheel balance-test jig.

With the turbocharger wheel rigidly locked into the turbocharger wheel balance-test jig, the dynamic balancing machine is then run 341, i.e., it causes the turbocharger wheel balance-test jig and the turbocharger wheel to be spun at a high rate of speed. Imbalance measurements are taken 343 at both a first datum plane and a second datum plane, with the turbocharger wheel balance-test jig and turbocharger wheel spinning, thereby establishing an imbalance level of the turbocharger wheel at the first plane, and an imbalance level of the turbocharger wheel at the second plane. The imbalance measurements may be in the form of a vector, having both and angular direction and a magnitude. Thus, for this running of the dynamic balancing machine four numbers are generated: a first vector for the first datum plane, and a second vector for the second datum plane. Each vector could be represented by an angle and a magnitude, or by an X and Y coordinate. In either case, together, the two vectors are represented by a total of four numbers.

The first datum plane is a plane normal to the turbine wheel axis of rotor rotation 105, and is axially located at the axial end 123 of the nose cone 119. The second datum plane is a plane normal to the turbine wheel axis of rotor rotation 105, and is axially located at the back face 117 of the hub 107.

The steps of preparing 331 the turbocharger wheel balance-test jig to receive the turbocharger wheel, placing 333 the back face of the turbocharger wheel on the base clamping face of the balance-test jig base, lowering 337 the turbocharger wheel balance-test jig arm, actuating 339 the turbocharger wheel balance-test jig actuator from the unlocked position to the locked position to rigidly lock the turbocharger wheel into the turbocharger wheel balance-test jig, running 341 the dynamic balancing machine to spin the turbocharger wheel balance-test jig and the turbocharger wheel, and measuring 343 imbalance measurements are then repeated 351 until a plurality of imbalance levels (each having four numbers representing two vectors) are established. During each repetition, the turbocharger wheel is positioned using the mark on the turbocharger wheel such that the rotational orientation of the turbocharger wheel with respect to the base is the same as in the original measurement (i.e., the same as the first time the subsequently repeated steps are conducted).

The Fifth Step

With reference to FIG. 9, the plurality of turbocharger wheel imbalance levels are then merged to form an estimated indicator of turbocharger wheel imbalance. More particularly, the measurements from each run of the dynamic balancing machine (i.e., the original run and each repeated run) are averaged, thus forming four numbers: a first average vector (e.g., a vector average at the first datum plane), and a second average vector (e.g., a vector average at the second datum plane).

The first and second average vectors are converted into average X and Y coordinates using straight forward geometry. The two average X coordinates (at the first and second datum planes) are added together to form a combined average X coordinate X'. Likewise, the two Y coordinates are added together to form a combined average Y coordinate Y'. Finally, the estimated indicator of turbocharger wheel imbalance is formed by calculating the magnitude of the combined average X and Y coordinates (X' and Y'), i.e., the square root of the sum of X' squared plus Y' squared (again, being straight forward geometry).

The total number of times the measurement steps are run on the combined turbocharger wheel and turbocharger wheel balance-test jig (including the first time) are preferably enough to provide data that, when merged (with the turbocharger wheel balance-test jig imbalance zeroed out), forms an estimated indicator of turbocharger wheel imbalance that is accurate and repeatable enough to represent turbocharger wheel imbalance. This total number of times can be experimentally ascertained, and might for example be 3 times, 5 times, 8 times or 10 times.

In the first alternative variation of the embodiment mentioned above, the measurement of the imbalance of the balance-test jig is subtracted from the data taken for the balance-test jig and wheel. This subtraction may occur either prior to or after the merger of the plurality of turbocharger wheel imbalance levels.

The Sixth Step

Under the sixth step 311, the estimated indicator of turbocharger wheel imbalance that was formed in the fifth step is compared to an acceptable indicator range (e.g., less than a certain number). The turbocharger wheel that was measured is rejected if the estimated indicator of the turbocharger wheel imbalance is outside of the acceptable indicator range. Assuming any other acceptance criteria are met (e.g., visual inspection for defects), the turbocharger wheel that was measured is accepted if the estimated indicator of the turbocharger wheel imbalance is within the acceptable indicator range.

It is to be understood that the invention comprises apparatus and methods for acceptance testing turbocharger wheels such as turbine wheels. Additionally, the various embodiments of the invention can incorporate various combinations of the features described above with other acceptance testing apparatus and methods. In short, the above disclosed features can be combined in a wide variety of configurations within the anticipated scope of the invention.

What is claimed is:

1. A turbocharger wheel balance-test jig, comprising:
   a base defining an axis of rotation, the base having a base clamping face forming at least a portion of a base conical feature that is normal to and rotationally symmetric around the axis of rotation;
   a clamp mechanism rigidly connected to the base; and
   an arm extending along the axis of rotation from the clamp mechanism toward the base clamping face, the arm having an arm clamping face forming at least a portion of an arm conical feature that is normal to and rotationally symmetric around the axis of rotation;
   wherein the base conical feature and the arm conical feature face one another;
   wherein the clamp mechanism includes an actuator that is actuatable between a locked position and an unlocked position, the locked position rigidly holding the arm with respect to the base, and the unlocked position providing for the arm to be axially moved along the axis of rotation; and
   wherein the clamp mechanism includes a stop configured to restrict rotation of the arm around the axis of rotation in both the unlocked and the locked positions.

2. The turbocharger wheel balance-test jig of claim 1, wherein:
   the clamp mechanism actuator includes a locking nut that is threadedly received on a collet; and
   the stop is further configured to restrict rotation of the collet around the axis of rotation in both the unlocked and the locked positions.

3. The turbocharger wheel balance-test jig of claim 2, wherein:
   the clamp mechanism includes a hollow cylindrical clamp housing;
   the collet is concentrically received within the clamp housing;
   the arm is concentrically received within the collet;
   the stop is a pin that is affixed to and extends across the clamp housing; and
   the pin passes through axially extending holes in the collet and an axially extending hole in the arm.

4. A method for acceptance testing an imbalance level of a turbocharger wheel, the turbocharger wheel including a hub having a back face and a nose cone, comprising:
   mounting the turbocharger wheel balance-test jig of claim 1 in a dynamic balancing machine;
   measuring an imbalance level of the of the turbocharger wheel balance-test jig using the dynamic balancing machine;
   zeroing all subsequent measured results based on this mounting of the test jig;
   measuring an imbalance level of the turbocharger wheel, using the dynamic balancing machine, a plurality of times, each time with the turbocharger wheel being separately installed in the turbocharger wheel balance-test jig, to establish a plurality of imbalance levels of the turbocharger wheel;
   forming an estimated indicator of turbocharger wheel imbalance based upon a combination of the plurality of the imbalance levels of the turbocharger wheel balance-test jig and the turbocharger wheel; and
   accepting or rejecting the turbocharger wheel based upon the estimated indicator of the turbocharger wheel imbalance.

5. The method for acceptance testing an imbalance level of a turbocharger wheel of claim 4, wherein the step of measuring an imbalance level of the of the turbocharger wheel balance-test jig includes the steps of:
   actuating the clamp mechanism actuator of the turbocharger wheel balance-test jig into its locked position if it is not already in that position;
   running the dynamic balancing machine; and
   taking an Imbalance measurement to establish an imbalance level of the turbocharger wheel balance-test jig.

6. The method for acceptance testing an imbalance level of a turbocharger wheel of claim 4, wherein the step of measuring an imbalance level of the turbocharger wheel of includes the steps of:
   (a) actuating the turbocharger wheel balance-test jig actuator into the unlocked position if it is not already in that position;
   (b) raising the balance-test jig arm if it is not already in that position;
   (c) centering the back face of the turbocharger wheel on the base clamping face;
   (d) lowering the turbocharger wheel balance-test jig arm to position the arm clamping face against the turbocharger wheel nose cone such that the balance-test jig arm is centered on the turbocharger wheel nose cone;
   (e) actuating the turbocharger wheel balance-test jig actuator from the unlocked position to the locked position such that the turbocharger wheel is rigidly locked into the turbocharger wheel balance-test jig;
   (f) running the dynamic balancing machine;
   (g) taking an Imbalance measurement to establish an imbalance level of the turbocharger wheel;
   (h) repeating steps (a) through (g) to establish a plurality of imbalance levels of the turbocharger wheel.

7. The method for acceptance testing an imbalance level of a turbocharger wheel of claim 6, wherein:

on the first time steps (a) through (g) are conducted, the step of measuring an imbalance level of the turbocharger wheel balance-test jig and the turbocharger wheel of further includes the step of marking the turbocharger wheel with a mark such that the rotational orientation with respect to the base is established; and on subsequent times steps (a) through (g) are conducted, the step of measuring an imbalance level of the turbocharger wheel balance-test jig and the turbocharger wheel further includes the step of positioning the turbocharger wheel using the mark such that the rotational orientation of the turbocharger wheel with respect to the base is the same as the first time steps (a) through (g) were conducted.

8. The method for acceptance testing an imbalance level of a turbocharger wheel of claim 4, wherein the step of zeroing comprises conducting a Zero Reset on the dynamic balancing machine after the step of measuring an imbalance level of the of the turbocharger wheel balance-test jig, and after the step of measuring an imbalance level of the turbocharger wheel.

9. The method for acceptance testing an imbalance level of a turbocharger wheel of claim 4, wherein the step of zeroing is conducted prior to the step of measuring an imbalance level of the turbocharger wheel.

\* \* \* \* \*